United States Patent [19]

Bartling et al.

[11] Patent Number: 4,888,884
[45] Date of Patent: Dec. 26, 1989

[54] METHOD AND PLANT FOR CLEANING DRYER EXHAUST GASES DURING THE DRYING OF WOOD CHIPS, WOOD FIBER OF THE LIKE

[75] Inventors: Werner Bartling, Elze; Fritz H. Jagode, Hameln, both of Fed. Rep. of Germany

[73] Assignees: Bison-Werke Baehre; Greten GmbH & Co. KG, both of Springe, Fed. Rep. of Germany

[21] Appl. No.: 192,272

[22] Filed: May 10, 1988

[30] Foreign Application Priority Data

May 11, 1987 [DE] Fed. Rep. of Germany ....... 3715668

[51] Int. Cl.4 ............................................. F26B 3/04
[52] U.S. Cl. ......................................... 34/32; 34/79; 34/82
[58] Field of Search .................. 34/79, 32, 60, 58, 69, 34/82; 55/302, 284

[56] References Cited

U.S. PATENT DOCUMENTS 3,387,380  6/1968  Pritts, Jr. ............................. 34/79 X
3,871,845  3/1975  Clarke et al. ...................... 55/302 X
4,771,708  9/1988  Douglass, Jr. ....................... 34/79 X Primary Examiner—Henry A. Bennet
Assistant Examiner—John Sòllecito
Attorney, Agent, or Firm—Townsend and Townsend

[57] ABSTRACT

A method of cleaning dryer exhaust gases during the drying of wood chips, wood fibers and the like is described in which at least one part of the dryer exhaust gases is filtered at a temperature lying above its dew point. At least one part of the particles which are filtered out in this way is conveyed, together with flushing air which likewise has a temperature above the dew point, substantially continuously into a combustion chamber and is burned there for hot gas generation.

15 Claims, 1 Drawing Sheet

U.S. Patent
Dec. 26, 1989
4,888,884
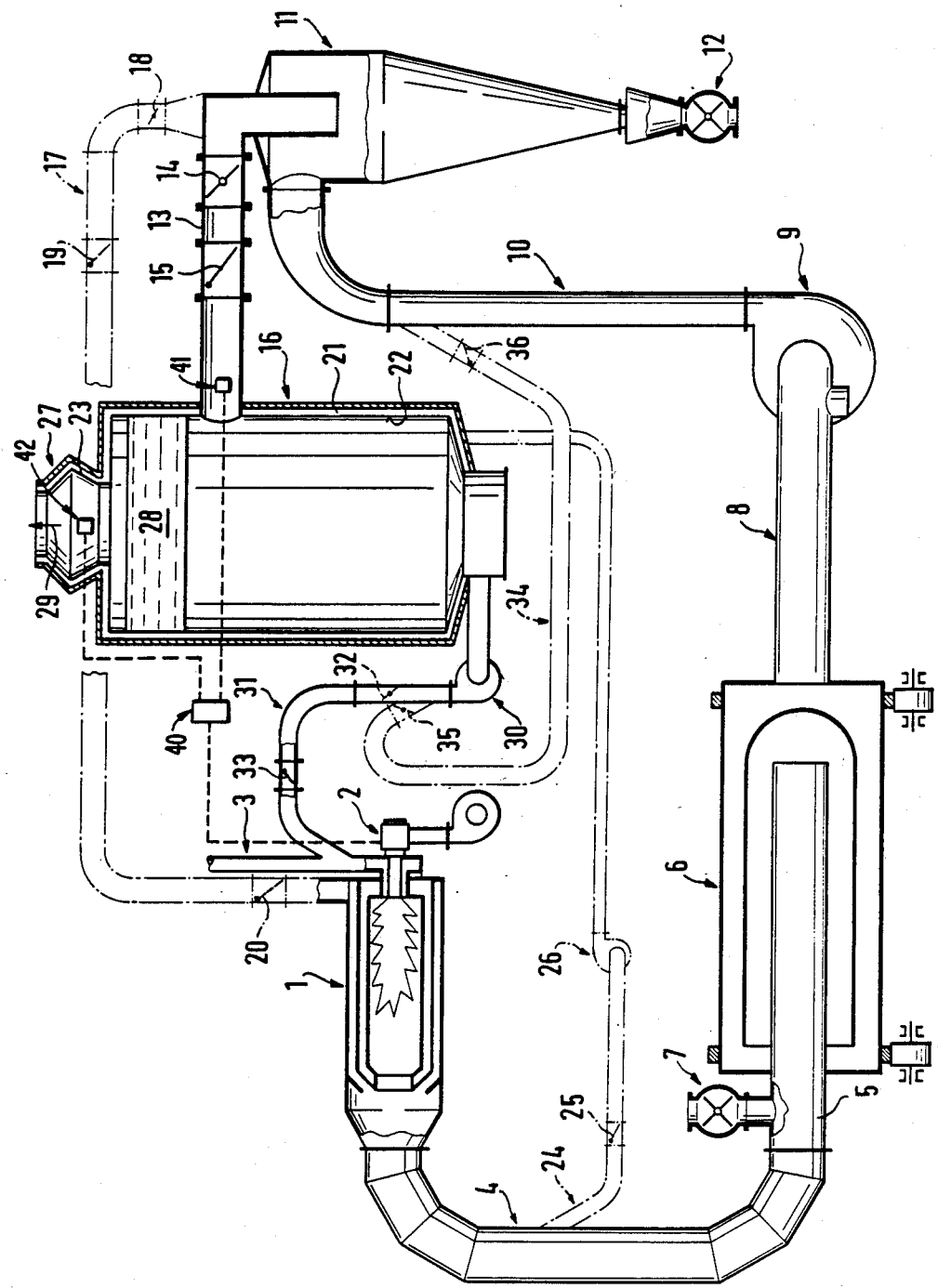

METHOD AND PLANT FOR CLEANING DRYER EXHAUST GASES DURING THE DRYING OF WOOD CHIPS, WOOD FIBER OF THE LIKE

The invention relates to a method of cleaning dryer exhaust gases during the drying of wood chips, wood fibers or the like by means of hot gases generated in a combustion chamber, wherein the dried material is separated from the dryer exhaust gases and provision is made for the filtering of the dryer exhaust gases.

Furthermore, the invention is directed to a plant for carrying out this method.

It is known that one can reduce emissions of moist exhaust gases from chip dryers through filter installations. It is however a problem that such installations clog up very rapidly. Accordingly it has at most been considered possible to maintain an exhaust gas value of approximately 30 mg/m$^3$ (German Journal: Holz als Roh- und Werkstoff 43 (1985), page 410, right hand column, paragraph 4, lines 14 to 20).

The present invention is based on the problem of providing a method of the initially named kind which, in a particularly economical manner, permits an intensive and problemfree cleaning of dryer exhaust gases.

In accordance with the invention the solution of this problem consists essentially in that at least a part of the dryer exhaust gases is filtered at a temperature above its dew point in filter hoses, filter sacks or the like; and in that at least a part of the particles which are filtered out thereby are conveyed, together with flushing air which serves to clean the filter hoses, sacks or the like and which has a temperature above the dew point, substantially continuously into a combustion chamber for the generation of hot gases and is burned.

In this way several advantages are obtained with regard to environmental protection and economy. In the first place exhaust gas values are achieved, both during fresh air operation and during recirculating operation which lie substantially under 30 mg/m$^3$, and indeed in many cases are no longer measurable. Damaging environmental effects due to air contamination are thus reliably avoided.

Moreover, problemfree, long term operation is ensured since disturbing adhesive effects due to resin, wood tar or other components are most extensively precluded. It is, moreover, of substantial importance to the invention that the particles which are filtered out are passed preferably fully, and substantially continuously into a combustion chamber which serves for hot gas generation in order to burn the particles here, so that subsequent disposal is completely avoided.

Thus, as a whole the method of the invention is characterised not only by a high level of economy but also by the fact that the requirements of environmental protection are greatly exceeded.

In a development of the method of the invention the possibility exists of further filtering the dryer exhaust gases which have been cleaned above the dew point in filter hoses, sacks or the like prior to the dryer exhaust gases escaping into the free atmospheric air, with this subsequent filtering for example taking place by means of carbon or gravel in order to pick up any organic materials contained in the wood and also any wood decomposition products which may be present, which above all give rise to the smell and irritant effect of the dryer exhaust gases.

Another variant of the method of the invention provides that the filtered out particles, in particular when relatively large quantities occur, are supplied together with flushing air as a partial flow to the flow of dried material and dryer exhaust gases which are to be cleaned, until the quantity of filtered out particles has been reduced to a predeterminable value which is matched to the circumstances in the combustion chamber. This procedure is particularly advantageous when relatively large quantities of filtered out particles occur. The reduction of the quantity of filtered out particles, including principally the wood dust particles, takes place in this variant on separation of the dried material from the dryer exhaust gases.

On introducing the flushing air care be taken in each case to ensure that no reduction of the temperature below the dew point results, since it is of importance for the manner of operation of the method that a reduction below the dew point temperature does not occur in any region of the overall system. If one operates with a system temperature which lies clearly above the dew point temperature then fresh air can be used without problem as flushing air. If the danger exists that an impermissible temperature reduction would occur through the introduction of fresh air as flushing air then dryer gases which are already at a temperature above the dew point are preferably used as flushing air.

The heating of the dryer exhaust gases which results via the burner is preferably regulated in dependence on the temperature at which the dryer exhaust gases are introduced into the filter apparatus, i.e. the energy generation in the combustion chamber should always be increased when the temperature falls short of a predeterminable desired temperature at the input to the filter apparatus.

The temperature at the outlet of the filter system which leads to the atmosphere is preferably also measured and a control loop is used to ensure that this temperature does not fall below the dew point temperature. The two measured temperatures at the input and output of the filter apparatus can thus be directly used to regulate the burner, and indeed optionally in superimposed form or in such a way that the difference temperature is used as a control parameter.

A particularly advantageous plant for carrying out the method of the invention includes a combustion chamber, a dryer connected with the combustion chamber via a hot gas duct and provided at its input side with a supply unit, a transport duct connected with the dryer outlet and provided with a conveyor fan, and a separating apparatus with a transport duct which opens into a filter apparatus. This plant is characterised, in accordance with the invention in that the transport duct which connects the separator apparatus and the filter apparatus is arranged to receive dryer exhaust gases lying above the dew point; in that the filter apparatus is insulated against environmental temperature effects; and in that between the filter apparatus and the combustion chamber there is arranged a transport duct for the filtered out particles for conveying them to the combustion chamber for combustion therein, with the transport duct including a fan for the filter flushing air.

A fan for generating a vacuum flushing airstream is preferably inserted into the transport duct extending between the filter apparatus and the combustion chamber and a regulating flap and a flap trap are furthermore preferably integrated into this duct. This tubular duct preferably opens into a burner induction pipe so that by presetting the quantity of vacuum flushing air, which can also be selected to be small heated air can be supplied in metered quantities to the combustion chamber. When this fan, as preferably intended, generates a relatively small quantity of vacuum flushing air at low pressure then this brings the associated advantage that the filter hoses or filter sacks can be particularly uniformly loaded and are above all subjected to low wear.

The filters themselves can consist of woven material, steel fabric, of plastic or of combinations hereof. It is particularly advantageous to use a two-layer filter construction in which the inner layer can consist of a coarse mesh support fabric and the outer layer preferably consists of a felt, in particular an asymmetrically constructed felt. This construction results in a particularly high degree of separation.

Furthermore, provision is preferably made in accordance with the invention, that filters in the form of hoses, sacks or the like which extend in a vertical plane are accommodated in the filter apparatus, with the filter material having a relatively low water imbibition value, preferably a maximum imbibition value of 1% and/or a certain smoothness, and/or is antistatic, and/or is subjected to low surface loading through low incident flow speeds.

In this way particularly long operating times can be achieved for the filter material. The permeability, i.e. the filter characteristic, remains constant and the resistance remains constant. The provision of a certain smoothness means that the particles adhere less strongly to the material and are thus easier to release from the material, or that the filter is easier to clean. An additional condition for achieving easy release of the particles from the filter and easy cleaning of the filter is that the temperature in the system must not fall below the dew point.

BRIEF DESCRIPTION OF THE DRAWING

The figure as herein disclosed shows a preferred embodiment of the invention.

The invention will now be explained in more detail in the following with reference to an embodiment and to the drawing, the single figure of which shows a plant for the cleaning of dryer exhaust gases during the drying of wood chips, wood fibers or the like.

The basic construction of the plant includes first of all a combustion chamber 1 in which the hot gas required for drying is generated by a burner 2. The burner 2 is which is for example operated with oil or gas and by the supply of fresh air at 3.

The hot gas passes out of the combustion chamber 1 through a tubular duct 4 and through a tube section 5 into a dryer 6. A supply unit 7 for the material to be dried which operates as a cellular wheel sluice is arranged at the input side of the dryer 6.

The construction of the dryer 6 can be chosen as desired, in the present case it is a three flue drum dryer (three pass drum dryer). Jet tube dryers, single flue and other multi-flue drum dryers or the like can also be considered.

The material to be dried, which is dispensed into the tube section 5 and is transported with the hot gas into the dryer 6, passes at the outlet of the dryer 6 into a tube section 8. The tube section 8 includes, in manner known per se, a closable apparatus (which is not illustrated) for separating out metallic articles such as screws, nails and similar foreign bodies.

A fan 9 conveys the dried material and the dryer exhaust gases in a tubular duct 10 to a cyclone 11 in which the dried material is separated from the dryer exhaust gases. While the dried material can fall via a drop out sluice 12 onto a transport device, into a hammer mill, or into a bunker, the total quantity of dryer exhaust gases flows, in fresh air operation, through a tubular duct 13 into a filter apparatus 16. A regulating device in the form of a regulating flap 14 and, for safety reasons, a flap trap 15 (check flap) are disposed in the tubular duct 13. During recirculating gas operation, a predeterminable part of the dryer exhaust gases flows via a tubular duct 17, in which a regulating flap 18 and flap traps 19 and 20 are installed, into the combustion chamber 1 or into a suitable mixing chamber.

The filter apparatus 16 preferably has the principal features of the air filter arrangement claimed in German patent No. 24 30 279 and its equivalent, U.S. Pat. No. 3,871,845, issued Mar. 18, 1975 to Clarke et al. for an Industrial Air Filter. It is however surrounded, in accordance with the invention, by material 21 insulated against environmental temperature effects at a spacing from the filter container walls and filter head walls 22 and 23. In this manner a favourable precondition is provided for to ensuring that the dryer exhaust gases to be cleaned in the filter apparatus 16 are kept above the dew point, which lies between approximately 60° and 80° C. In addition it is of advantage in this arrangement to branch off a part of the hot gas generated by means of the burner 2 and to pass it via a tubular duct 24 with an inbuilt flap trap 25 and an inbuilt fan 26 into the jacket 21 of the filter apparatus 16. The tubular duct 13 can likewise be insulated.

In the upper region of the filter apparatus 16 an exchangeable carbon, gravel, or like filter unit 28 is arranged between the connection for the tubular duct 13 and the filter head 27.

The dryer exhaust gases to be cleaned which are supplied to the filter apparatus 16 via the tubular duct 13 flow with reference to the air filter arrangement of DE-PS No. 24 30 279 downwards through a central tube into the base region of the filter apparatus 16 and from there into chambers which are distributed around the central tube and in which filters in the form of hoses, sacks or the like extending in a vertical plane are accommodated.

The temperature at the outlet of the filter system which leads to the atmosphere is preferably also measured and a control loop is used to ensure that this temperature does not fall below the dew point temperature. The two measured temperatures, sensed by respective temperature sensors at the input 41 and output 42 of the filter apparatus, can thus be directly used to regulate the burner, and indeed optionally in superimposed form or in such a way that the difference temperature, as determined by controller 40, is used as a control parameter.

While the dryer exhaust gases escape in the direction of the arrow 29 into the free atmosphere through the above named filters and through the filter unit 28 the particles which are retained at the inner sides of the filter are removed by a vacuum flushing airflow above the dew point which is generated by means of a fan 30.

A cleaning duct runs around the base region of the filter apparatus 16 and is brought in each case into communication with the opening of one radial chamber to which in each case one filter parcel is attached. The cleaning channel completes one revolution every three minutes, for example, so that the filter parcels are continuously cleaned one after the other in this time sequence.

The particles which are filtered out pass in the flushing airflow above the dew point continuously through a tubular duct 31 which has a regulating flap 32 and a flap trap 33, into the combustion chamber 1 or into a mixing chamber known per se.

It is however also advantageous to provide a tubular duct 34 with a regulating flap 35 and a flap trap 36 after the fan 30 between the tubular ducts 31 and 10. In this way, with an appropriate position of the regulating flaps 32 and 35, a partial flow of flushing air enriched with filtered out particles can be branched off in order to direct it into the flow of dried material and dryer exhaust gases which are to be cleaned. The size of the branched off partial flow depends on the prevailing total quantity of filtered out particles and also on the preset power level of the combustion chamber or mixing chamber.

The subject of the invention is suitable both for new plants and also for retrofitting existing plants and has a high degree of adaptability to the respectively prevailing operating conditions. In all cases it ensures surprisingly high economy of operation.

We claim:

1. A method of cleaning dryer exhaust gases during drying of wood chips, wood fibers or the like by means of hot gases generated in a combustion chamber, wherein the dried material is separated from the dryer exhaust gases and provision is made for the filtering of the dryer exhaust gases, characterised in that at least a part of the dryer exhaust gases is filtered at a temperature above its dew point in filter hoses, filter sacks or the like; and in that at least a part of the particles which are filtered out thereby are conveyed, together with flushing air which serves to clean the filter hoses, sacks or the like and which has a temperature above the dew point, substantially continuously into a combustion chamber for the generation of hot gases and is burned.

2. A method in accordance with claim 1, characterised in that the dryer exhaust gases cleaned above their dew point in filter hoses, filter sacks or the like is filtered again prior to their escape into the free atmospheric air by means of carbon, gravel or a filter material comparable herewith.

3. A method in accordance with claim 1, characterised in that the particles which are filtered out are supplied together with flushing air as a partial flow to the flow of dried material and dryer exhaust gases which are to be cleaned.

4. A method in accordance with claim 3, characterised in that the filtered out particles, in particular when relatively large quantities occur, are supplied together with flushing air as a partial flow to the flow of dried material and dryer exhaust gases which are to be cleaned, until the quantity of filtered out particles has been reduced to a predeterminable value which is matched to the circumstances in the combustion chamber or in the mixing chamber.

5. A method in accordance with claim 1, characterised in that fresh air and/or dryer exhaust gases at a temperature above the dew point are used as flushing air.

6. A method in accordance with claim 1, characterised in that at least a part of the dryer exhaust gases is branched off prior to entry into the filter apparatus and is fed back again directly into the combustion chamber while forming a closed circuit.

7. A method in accordance with claim 1, characterised in that a temperature measurement is effected in the region of the outflow of the cleaned air into the atmosphere, and/or the temperature of the dryer exhaust gases is measured at the input to the filter apparatus; and in that the burner control is influenced in dependence on at least one of these temperature measurements in such a way that the temperature of the cleaned dryer exhaust gases emerging into the atmosphere lies at least substantially not below the dew point.

8. A plant for cleaning dryer exhaust gases comprising a combustion chamber, a dryer connected with the combustion chamber via a hot gas duct and provided at its input side with a supply unit, a transport duct connected with the dryer outlet and provided with a conveyor fan, and a separating apparatus with a transport duct which opens into a filter apparatus, characterised in that the transport duct (13) which connects the separator apparatus (11) and the filter apparatus (16) is arranged to receive dryer exhaust gases lying above the dew point; in that the filter apparatus (16) is insulated against environmental temperature effects; and in that between the filter apparatus (16) and the combustion chamber (1) there is arranged a transport duct (31) for the filtered out particles for conveying them to in the combustion chamber (1) for combustion therein, the transport duct including a fan (30) for the filter flushing air.

9. A plant in accordance with claim 8, characterised in that the filter apparatus (16) has a jacket insulated against environmental temperature effects which is arranged spaced from the filter container walls and filter head walls (22, 23), which is in particular of double-wall construction, and which is heated by oil, electrical energy, water vapour or hot gas.

10. A plant in accordance with claim 9, characterised in that a tubular duct (24) with an inbuilt flap trap (25) and an inbuilt fan (26) is arranged between the tubular duct (4) and the double jacket (21) of the filter apparatus (16).

11. A plant in accordance with claim 8, characterised in that a fan (30) for generating a vacuum flushing air flow, a regulating flap (32) and a flap trap (33) are built into the transport duct (31).

12. A plant in accordance with claim 8, characterised in that a tubular duct (34) with a regulating flap (35) and a flap trap (36) branches off from the transport duct (31) after the fan (30) and extends to the duct (10) carrying the dryer exhaust gases.

13. A plant in accordance with claim 8, characterised in that filters in the form of hoses, sacks or the like which extend in a vertical plane are accommodated in the filter apparatus (16), with the filter material having a relatively low water imbibition value, preferably a maximum imbibition value of 1% and/or a certain smoothness, and/or is antistatic, and/or is subjected to low surface loading through low incident flow speeds.

14. A plant in accordance with claim 8, characterised in that an interchangeable carbon, gravel or like filter unit (28) is arranged in the upper region of the filter apparatus (16) between the connection for the tubular duct (13) and the filter head (27).

15. A plant in accordance with claim 8, characterised in that the cyclone (11) and the tubular ducts (13, 17, 24, 31, 34) are insulated against environmental temperature effects.

* * * * *